United States Patent [19]

Monta et al.

[11] Patent Number: 5,517,254

[45] Date of Patent: May 14, 1996

[54] PROGRAM TABLE DISPLAYING APPARATUS

[75] Inventors: Hiroki Monta, Osaka; Hidemi Henmi, Shiga; Masayoshi Hirashima, Osaka, all of Japan

[73] Assignee: Matsushita Electric Industrial Co., Ltd., Osaka, Japan

[21] Appl. No.: 285,807

[22] Filed: Aug. 4, 1994

[30] Foreign Application Priority Data

Dec. 27, 1993 [JP] Japan .................................. 5-333400

[51] Int. Cl.$^6$ ............................................. H04N 5/445
[52] U.S. Cl. ......................... 348/569; 348/906; 348/563; 348/468; 358/335; 455/4.2; 455/6.2
[58] Field of Search .................................. 348/569, 563, 348/468, 473, 6, 12, 13, 7, 906; 358/335; 360/27, 15, 55, 79, 33.1; 455/4.2, 6.2; H04N 5/445

[56] References Cited

U.S. PATENT DOCUMENTS

| | | | |
|---|---|---|---|
| 4,706,121 | 11/1987 | Young | 348/563 |
| 5,166,911 | 11/1992 | Misawa et al. | 360/33.1 |
| 5,260,788 | 11/1993 | Takano et al. | 348/563 |
| 5,293,249 | 3/1994 | Hoong | 358/335 |
| 5,353,121 | 10/1995 | Young et al. | 348/563 |
| 5,361,173 | 11/1994 | Ishii et al. | 360/27 |
| 5,390,027 | 2/1995 | Henmi et al. | 358/335 |

FOREIGN PATENT DOCUMENTS

| | | | |
|---|---|---|---|
| 1-307944 | 12/1989 | Japan | H04N 5/782 |
| 3-30140 | 2/1991 | Japan | H04N 5/782 |

*Primary Examiner*—James J. Groody
*Assistant Examiner*—Glenton B. Burgess
*Attorney, Agent, or Firm*—Ratner & Prestia

[57] ABSTRACT

A program table displaying apparatus includes a display controlling apparatus for displaying a program table for a plurality of programs in a table on a display. The table has a horizontal row with a channel number identifying a channel corresponding to one of the programs and a vertical row with a time number for the channel. The television program table is derived from a plurality teletext broadcasts. Also included is a program reserving apparatus for reserving a desired program by selecting one of the programs. A time comparing apparatus is further provided for comparing a current displayed time frame and the time number for the channel to determine if there is a corresponding program for the displayed time frame. Further provided is a minute information extracting device for extracting minute data corresponding to said corresponding program. A program title extracting apparatus is also included for extracting a program title corresponding to the corresponding program and a number of rows calculating apparatus is provided for calculating a number of rows from the minute data and the number of letters in the program title. Finally, a time frame determining apparatus is included for determining a corresponding time frame from the calculated number of rows.

7 Claims, 11 Drawing Sheets

| time | [Channel #1] | [Channel #2] | [Channel #3] | [Channel #4] |
|---|---|---|---|---|
| 8: | 15 TV drama<br>40 My journal | 00 News<br>30 Gourmet | 00 Wide show | 00 Morning |
| 9: | 00 News<br>30 Education | 00 Theater | 00 Stories<br>40 Stock | |
| ⋮ | | | | |
| 1: | 00 News<br>45 TV drama | 00 Movies A | 00 News<br>30 Children | 00 Wide show |
| 2: | 00 Tennis<br>30 Health | 00 Movies B | 00 Suspence | 00 From 30 |

FIG. 3

| time | [Channel #1] | [Channel #2] | [Channel #3] | [Channel #4] |
|---|---|---|---|---|
| 8: | 15 TV drama<br>40 My journal | 00 News<br>30 Gourmet | 00 Wide show | 00 Morning |
| 9: | 00 News<br>30 Education | 00 Theater | 00 Stories<br>40 Stock | |
| ⋮ | | | | |
| 1: | 00 News<br>45 TV drama | 00 Movies A | 00 News<br>30 Children | 00 Wide show |
| 2: | 00 Tennis<br>30 Health | 00 Movies B | 00 Suspence | 00 From 30 |

FIG. 7

| time | [Channel #2] | | [Channel #3] | [Channel #1] |
|---|---|---|---|---|
| 8: | 00 News<br>30 Gourmet | 00 Morning | 00 Wide show | 15 TV drama<br>40 My journal |
| 9: | 00 Theater | | 00 Stories<br>40 Stock | 00 News<br>30 Education |
| ⋮ | | | | |
| 1: | 00 Movies A | 00 Wide show | 00 Movies C<br>30 Children | 00 News<br>45 TV drama |
| 2: | 00 Movies B | 00 From 30 | 00 Suspence | 00 Tennis<br>30 Health |

FIG. 9

| time | [own Channel] | [Channel #1] | [Channel #2] | [Channel #3] |
|---|---|---|---|---|
| 8: | 00 Wide show [Channel #3] | 15 TV drama 40 My journal | 00 News 30 Gourmet | 00 Wide show |
| 9: | 00 Theater [Channel #2] | 00 News 30 Education | 00 Theater | 00 Stories 40 Stock |
| ⋮ | | | | |
| 1: | 00 Movies A [Channel #2] | 00 News 45 TV drama | 00 Movies A | 00 Wide show 30 Children |
| 2: | 00 From 30 [Channel #4] | 00 Tennis 30 Health | 00 Movies B | 00 Suspence |

FIG. 11

PROGRAM TABLE DISPLAYING APPARATUS

BACKGROUND OF THE INVENTION

The present invention relates to a program table displaying apparatus for displaying a program table of different television programs from a number of channels on a television screen using data derived from teletext broadcasts and for reserving a program to be recorded by choosing the desired program from the table.

DESCRIPTION OF THE PRIOR ART

Various methods for reserving recording television broadcasts for recording have been devised as a result of the spread of video cassette recorders. One of them is a recording reservation system (cf. BTA standard T-003) which broadcasts a television program table using a teletext broadcast from a transmitter. The information necessary for recording a video for a cassette recorder is extracted from the television program table information at the receiver.

A block diagram of a program table displaying apparatus using a teletext receiver in accordance with the prior art is shown in FIG. 1. A video signal having a text signal which is superimposed on the video signal during the vertical retrace period is inputted to a text signal extracting means 1, where a text signal is only extracted Program data of a television program table is extracted by a program table extracting means 2 from a certain program number (identity number) in the text signal extracted by the text signal extracting means 1. If the program number in the television program table has been previously determined, it may be frozen, and if it is not yet determined, it may be preset. Then, the program data of the television program table extracted at the program table extracting means 2 is stored in a buffer memory means 3. The program data of the television program table is read from the buffer memory means 3 in response to an indication by a presentation requesting means 4. Then the read data is decoded to text and pattern information at a teletext decoding means 5. The text and pattern information decoded at the teletext decoding means 5 is displayed on a display means 7 as a program table for a certain channel through a display controlling means 6. When a program is reserved for recording, a desired program is selected from the program table for that channel displayed on the display means 7 at a program reserving means 8, and the program selected at the program reserving means 8 is displayed on the display means 7 together with the program table for that channel after being processed (painted and so on) at the display controlling means 6.

However, at the program table displaying apparatus in accordance with the prior art, a program table for only one channel is displayed on the screen. If users want to see a program table for a different channel, they must change the channel to the channel they want to see, and because the table form of the program table may be different for different channels, it is difficult to understand the program table at a glance.

Furthermore, there is no distinction between programs which are reserved very often and programs which are not reserved often when recordings are reserved from the program table for a number of channels.

SUMMARY OF THE INVENTION

A program table displaying apparatus in accordance with the first exemplary embodiment of the present invention includes a display controlling means for displaying a program table for a number of channels in a table form on a television screen. The table includes a channel number indication in the horizontal row and time indication in the vertical row. The television program table is derived from the television program table information from teletext broadcasts. Also included is a program reserving means which can reserve a program just by selecting the desired programs. A broadcasting station name extracting means is provided for extracting the station names from the information of the program tables and for displaying the station names on the screen. A time comparing means is also provided to compare a present displayed time frame displayed and the time information of the program table for a certain channel. Also included is a minute information extracting means for extracting minute information of a program (if there is a program corresponding to the time frame at the time comparing means). The minute information indicates the duration of a program in minutes. Further provided is a program title extracting means for extracting a program title of a corresponding program. In addition, number of rows calculating means is provided for calculating the number of rows from the minute information and the number of letters of the program title extracted at the minute information extracting means and the program title extracting means, respectively. Further included is a time frame determining means for determining the corresponding time frame from the maximum value calculated at the number of rows calculating means among the plural channels displayed at present.

A program table displaying apparatus in accordance with the second exemplary embodiment of the present invention includes a display controlling means for displaying a program table for plural channels in a table form with channel number indicated in a horizontal row and time indicated in a vertical row. The program table is derived using the television program table information from teletext broadcasts. Also included is a program reserving means which can reserve a program just by selecting the desired programs. A frequency per reserved program calculating and storing means is also provided for calculating the frequency per reserved program and a reserved program priority determining means for determining the priority of the high reserved frequency program in the program table displayed on the screen based on the frequency calculated at the frequency per reserved program calculating and recording means. A color processing means is also provided for painting the high priority program extracted at the reserved program priority determining means.

A program table displaying apparatus in accordance with the third exemplary embodiment of the present invention includes a display controlling means for displaying a program table on a television screen for a plurality of channels in a table form with a channel number indicated in a horizontal row and time indicated in a vertical row. The program table is derived using the television program table information from the teletext broadcasts which are being received or which have already been received and stored. A program reserving means is provided to reserve just a program by selecting the desired programs. A frequency per reserved program calculating and recording means calculates the frequency per reserved program, and a channel number priority determining means determines the priority of the channel number having many high reserved frequency programs in the program table displayed on the screen based on the frequency calculated at the frequency per reserved program calculating and recording means. Further included is a channel number priority changing means for changing the priority order of the channels at the channel number priority determining means.

A program table displaying apparatus in accordance with the fourth exemplary embodiment of the present invention includes a display controlling means for displaying a program table on a television screen for a plurality of channels in a table form where channel numbers are indicated in a horizontal row and time is indicated in a vertical row. The program table is derived using the television program table information from teletext broadcasts. Also provided is a program reserving means which can reserve a program by selecting the desired programs and a frequency per reserved program calculating and recording means for calculating the frequency per reserved program and a reserved program priority determining means for determining the priority of the high reserved frequency program in the program table displayed on the screen based on the frequency calculated at the frequency per reserved program calculating and recording means. A user's own channel making means is also provided for making a user's exclusive program table by putting the high priority programs determined at the reserved program priority determining means in the first vertical row of the program table along with its matched vertical time indication.

A program table displaying apparatus in accordance with a first exemplary embodiment of the present invention allows simultaneously displayed programs for plural channels to be recognized. In addition, the program gives an appearance similar to a feeling like a television program column of a newspaper by arranging the program time for the channels to be displayed in order.

A program table displaying apparatus in accordance with a second exemplary embodiment of the present invention improves program recognition by painting the programs which are reserved often. In addition, the second exemplary embodiment shortens the time necessary for recording reservation and improves the operability when a number of programs are reserved for recording simultaneously.

A program table displaying apparatus in accordance with a third exemplary embodiment of the present invention improves program recognition by arranging the program table priority by the frequency of reservation for a channel. As a result, time is shortened for recording reservation and operability is improved.

A program table displaying apparatus in accordance with a fourth exemplary embodiment of the present invention improves program recognition by displaying the user's exclusive program table in which the most often reserved programs are gathered in the first vertical row of the program table. As a result, time is shortened for recording reservation and operability is improved.

BRIEF DESCRIPTION OF THE DRAWINGS

FIG. 3 is an example of program table display using a program table displaying apparatus in accordance with the first exemplary embodiment of the present invention.

FIG. 7 is an example of program table display using a program table displaying apparatus in accordance with the second exemplary embodiment of the present invention.

FIG. 9 is an example of program table display using a program table displaying apparatus in accordance with the third exemplary embodiment of the present invention.

FIG. 11 is an example of program table display using a program table displaying apparatus in accordance with the fourth exemplary embodiment of the present invention.

DETAILED DESCRIPTION OF THE INVENTION (First exemplary embodiment)

Figure 1:
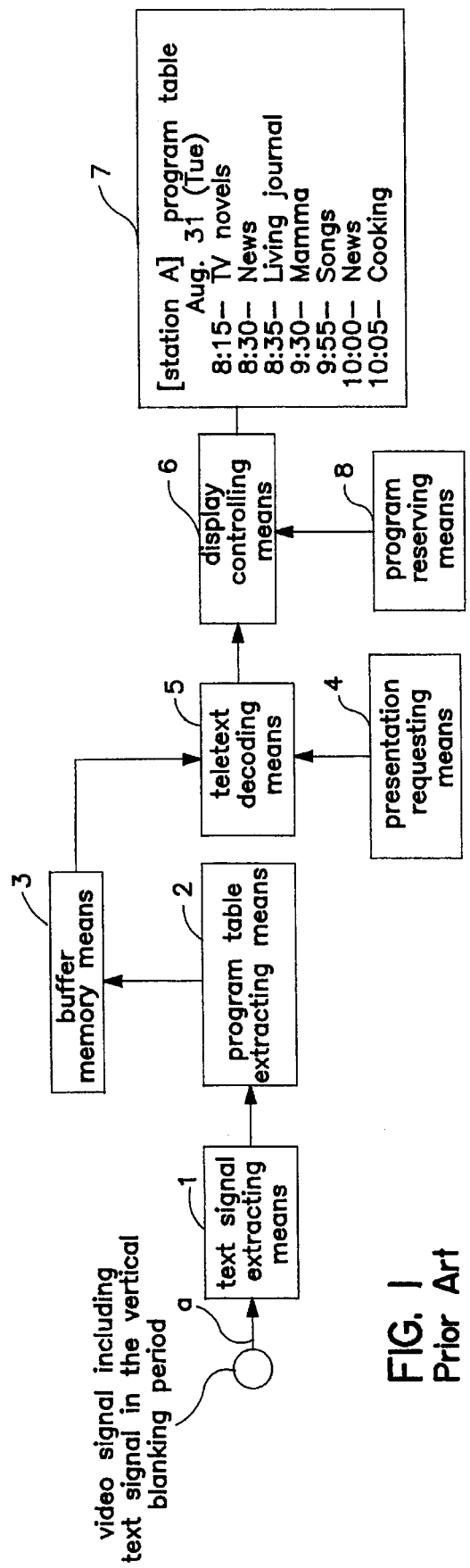
FIG. 1 is a block diagram of a program table displaying apparatus in accordance with the prior art.
Figure 2:
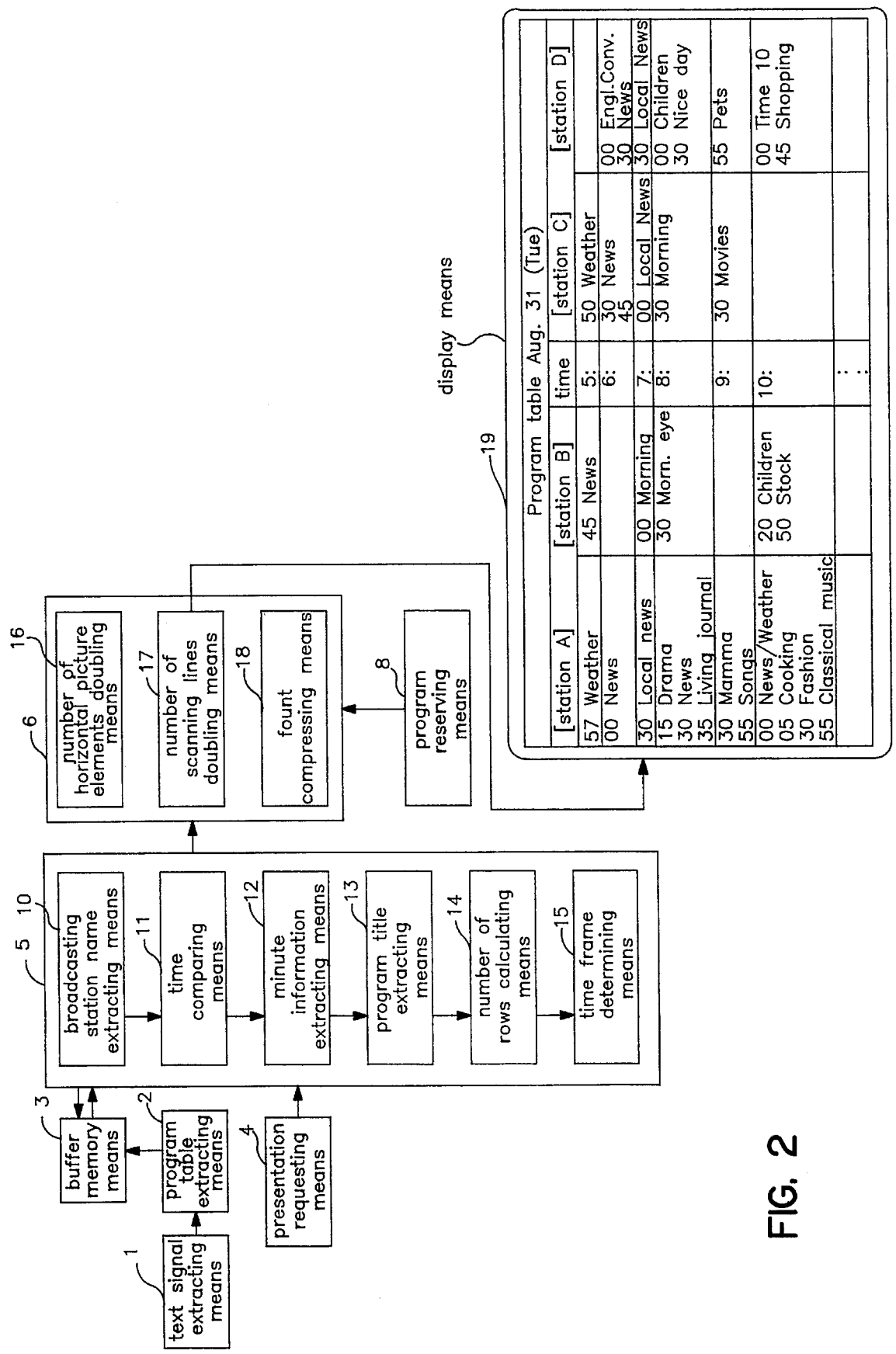
FIG. 2 is a block diagram of a program table displaying apparatus in accordance with a first exemplary embodiment of the present invention.

FIG. 2 is a block diagram of a program table displaying apparatus in accordance with a first exemplary embodiment of the present invention. The blocks having similar functions to those in FIG. 1 are numbered the same.

In FIG. 2, a broadcasting station name extracting means 10 extracts a broadcasting station name from the program table information. Time comparing means 11 compares the time displayed in a time frame with the time information in the program table for a certain channel currently displayed on the screen, and determines if there is a corresponding program to be displayed in the corresponding time frame. If a corresponding program is detected in the time frame by the time comparing means 11, minute information extracting means 12 extracts minute information of the corresponding program from the program table. Program name extracting means 13 also extracts program name information of the corresponding program from the program table, if a corresponding program is detected in the time frame by the time comparing means 11.

Number of rows calculating means 14 calculates the number of rows from the minute information extracting means 12 for the time frame and the number of letters extracted at the program title extracting means 13. Time frame determining means 15 determines for the time frame the maximum value of the number of rows counted by the number of rows calculating means 14.

Number of horizontal picture elements doubling means 16 doubles the number of horizontal picture elements of the ordinary teletext broadcast. Number of scanning lines doubling means 17 doubles the number of scanning lines of the ordinary teletext broadcast displayed by interlacing the lines in a manner similar to that employed in ordinary television receivers. Fount compressing means 18 compresses the letter size to ¼ the letter size of the ordinary teletext broadcast.

Figure 4:
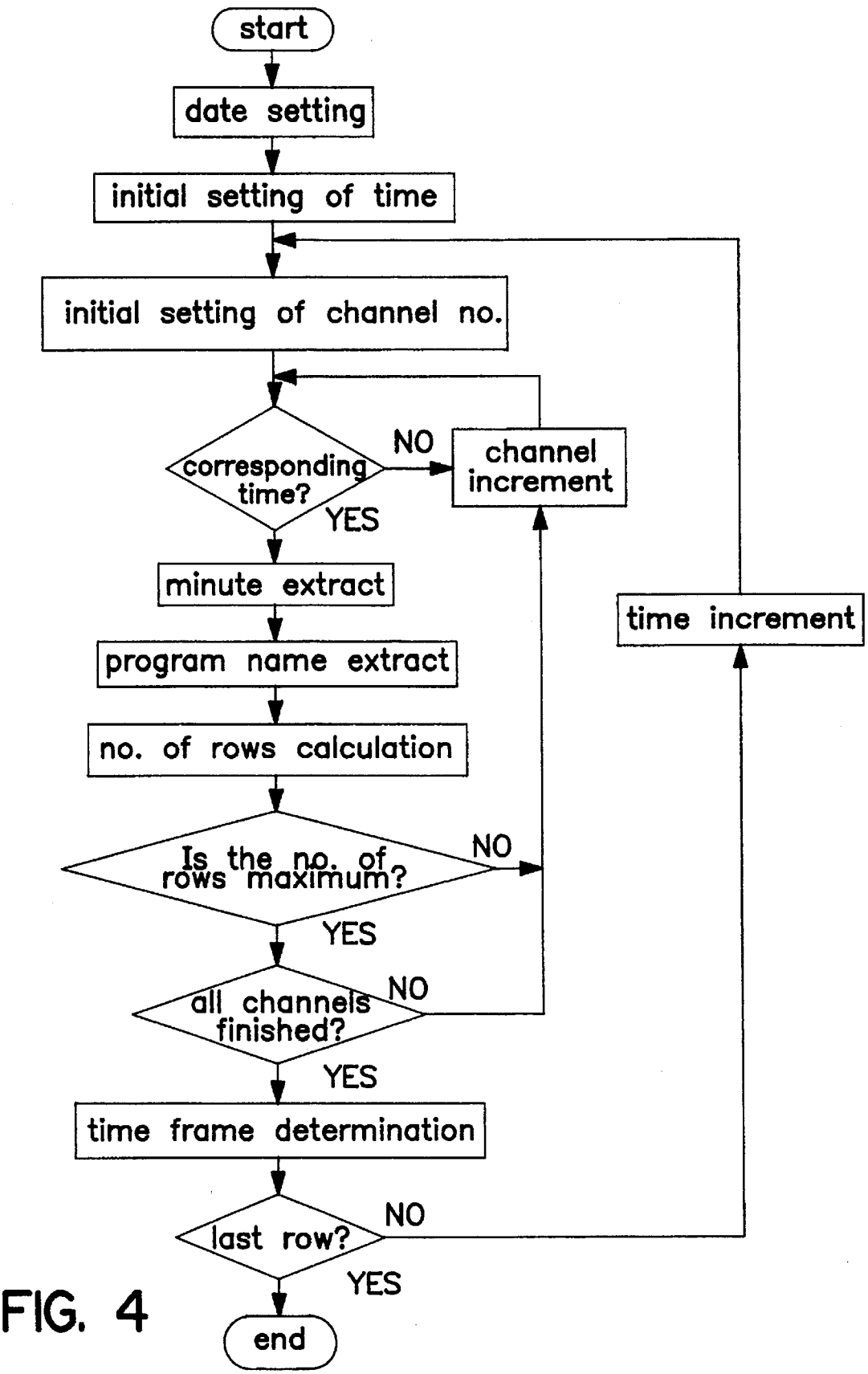
FIG. 4 is a flow chart for making a program table at a program table displaying apparatus in accordance with the first exemplary embodiment of the present invention.

FIG. 3 is an example of the program table display using a program table displaying apparatus in accordance with the first exemplary embodiment of the present invention. FIG. 4 is a flow chart for making a program table in the program table displaying apparatus in accordance with the first exemplary embodiment of the present invention.

Referring to FIG. 4, first, a date (for example, August 31st) is set. Next, a time (for example, five o'clock) is set. Then, a channel number (for example, Channel #1) is set. A search of the program table information is then performed to identify a program corresponding to the set time and set channel by the time comparing means 11. If there is no corresponding program, the channel number is increased to channel #2 and a new search is performed to identify whether a corresponding program exists on the set time. If there is no corresponding program, a similar search is repeated for all the channels displayed on the screen. If a corresponding program exists for the set time, the minute information for the corresponding program to that time is extracted by the minute information extracting means 12, and the program name of the corresponding program is extracted at the program name extracting means 13. Then, the number of rows is calculated at the number of rows calculating means 14 using the number in letters in the title of each program title extracted by the minute information extracting means 12 and the program name extracting means 13.

Now, assuming that the calculated value is N1, the channel is changed from station A to, for example, station B, where the program name information and the minute information of another program corresponding to the set time (5 o'clock) is extracted. Then the number of rows is calculated from the number of letters in the program title. The calculated value is assumed to be N2. Similarly, the calculated values for other channels are assumed to be N3 and N4. The number of rows for the set time frame is determined from a maximum value from the calculated values, N1, N2, N3, and N4 by the time frame determining means 15 so that the four channels can be displayed simultaneously. This process is similarly repeated for all of the rows.

Once the time frame is determined, minute information and program title for each channel corresponding to each time frame is displayed simultaneously. The display of the four channels on the display means 19 by the number of horizontal picture elements doubling means 16, the number of scanning lines doubling means 17, and the fount compressing means 18 is shown in FIG. 3. The station name extracted from the program table information by the station name extracting means 10 is displayed on the display means.

When a program is reserved for recording, as with the prior art, the desired program is selected from the program table from the channels displayed on the display means 19 by the program reserving means 8. The programs selected at the program reserving means 8 are highlighted, colored on the table display, by the display controlling means 6 and displayed together with the program table on the display means 19.

The following methods can be used to store the program table information (1) Program table information from the teletext channel can be stored for every channel selection.

(2) Program table information sent by stations using teletext broadcasting can be sequentially received when the television receiver is turned on and the program table information for all of the stations is stored.

(3) Program table information sent by stations using teletext broadcasting can be sequentially received every day at a specified time when program table information is renewed, and at substantially the same time, the program table information for all stations are stored.

(4) Program table information sent by stations using teletext broadcasting can be sequentially received at a periodic time interval every day providing updated program table information, and at substantially the same time, the program table information for all of the stations are stored.

The program table display for the channels may be implemented differently. For example, the hour on the program table may be displayed in the center row as shown in FIG. 2, on the right side of the display as shown in FIG. 3, on the left side, or on both sides.

(Second exemplary embodiment)

Figure 5:
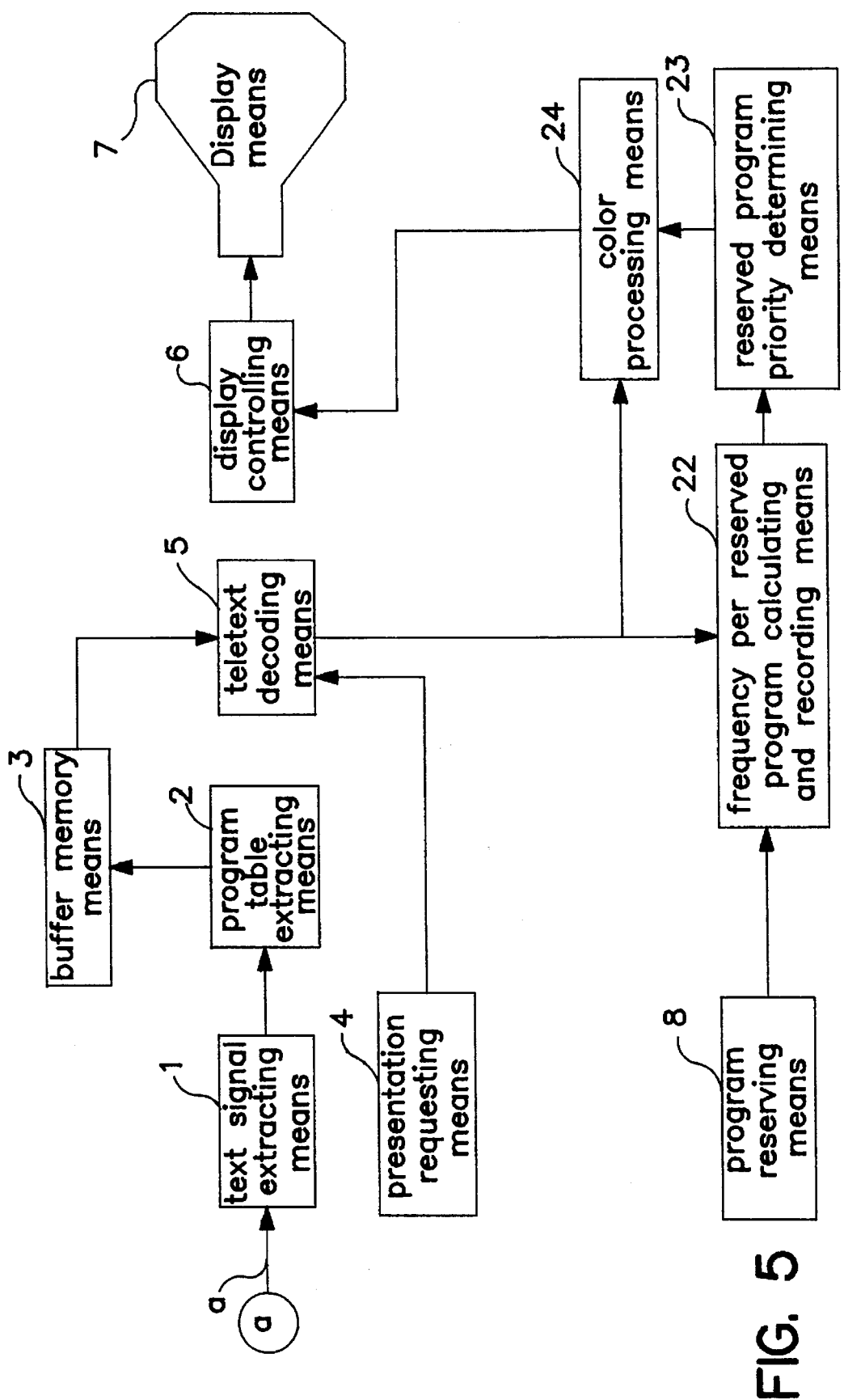
FIG. 5 is a block diagram of a program table displaying apparatus in accordance with a second exemplary embodiment of the present invention.

FIG. 5 is a block diagram of a program table displaying apparatus in accordance with a second exemplary embodiment of the present invention. The blocks having similar functions to those in FIG. 1 have the same reference numbers.

Frequency per reserved program priority determining means 22 calculates and stores the frequency of a reserved program. Reserved program priority determining means 23 extracts the program's reservation frequency from the program table displayed on the screen and, based on the frequency calculated at the frequency per reserved program priority determining means 22, determines the priority order of the programs. Color processing means 24 highlights, colors, the high priority programs extracted at the reserved program priority determining means 23 on the program table displayed on the screen.

Figure 6:
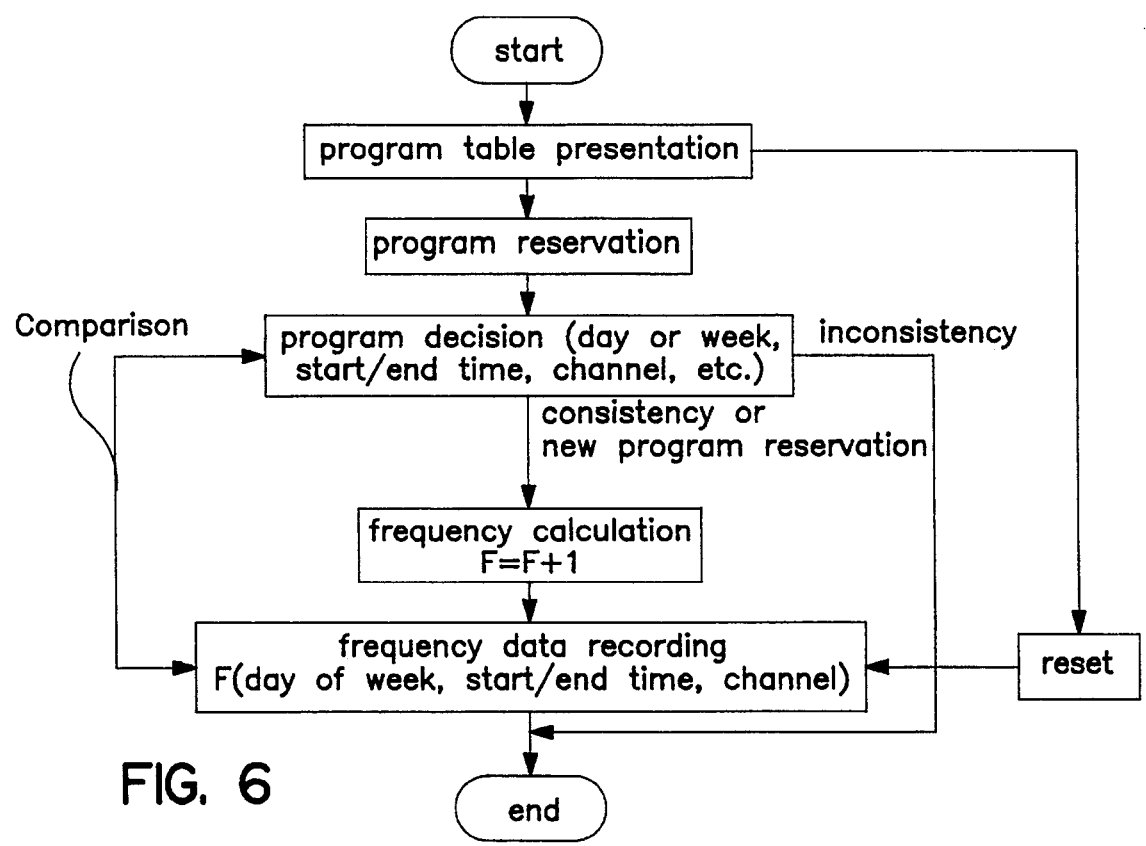
FIG. 6 is a flow chart for calculating and storing a frequency a program is reserved in a program table displaying apparatus in accordance with the second exemplary embodiment of the present invention.

FIG. 6 is a flow chart for calculating and storing the frequency a program is reserved in the program table displaying apparatus. FIG. 7 is an example of program table displayed on the screen.

Referring to FIG. 6, the program to be reserved is selected at the program reserving means 8 from the program table displayed on the display means 7. The program data including day of the week, time to start, time to end, channel number, etc. of the program to be reserved is provided to the frequency per reserved program calculating and storing means 22 from the program table decoded at the teletext decoding means 5. The reserved program data for past reserved programs is stored in the frequency per reserved program calculating and storing means 22 in a 4-dimensional arrangement, F(day of the week, time to start, time to end, channel number), showing the day of the week, time to start, time to end, and channel number as parameters.

The newly reserved program data is compared to the past reserved program data by comparing the day of the week, time to start, time to end, and channel number. When the new and past reserved program data coincide, that is, the same program was reserved in the past, the frequency of reservation is calculated for the program. When the data does not coincide, for example, for a special program, the frequency of reservation is not calculated.

The frequency data is expressed in a 4-dimensional arrangement, F(day of the week, time to start, time to end, channel number) so that an incremental calculation, F(day of the week, time to start, time to end, channel number) =F(day of the week, time to start, time to end, channel number)+1 is executed to increment the frequency. If there is no past frequency data in the past, that is, for a newly reserved program, F(day of the week, time to start, time to end, channel number) is set equal to 1.

When the program information is changed, for example, for a newly planned programs, the 4-dimensional arrangement, F(day of the week, time to start, time to end, channel number) corresponding to that program frame is erased. The high reservation frequency programs calculated at the frequency per reserved program calculating and storing means 22 are extracted by the reserved program priority determining means 23 and arranged in order according to frequency of reservation. Several programs having a high priority as determined by the reserved program priority determining means 23 are highlighted, colored, by the color processing means 24 and are displayed on the display means 7 through the display controlling means 6.

For example, assuming that "Wide show" of Channel #3, "Theater" of Channel #2, "Movies A" of Channel #2, and "From 30" of Channel #4 are high reservation frequency programs of the program table shown in FIG. 3, only four of the programs are highlighted on the program table which is displayed on the display means 7 as shown in FIG. 7. In FIG. 7, the highlighted program is indicated by the shaded area.

(Third exemplary embodiment)

Figure 8:
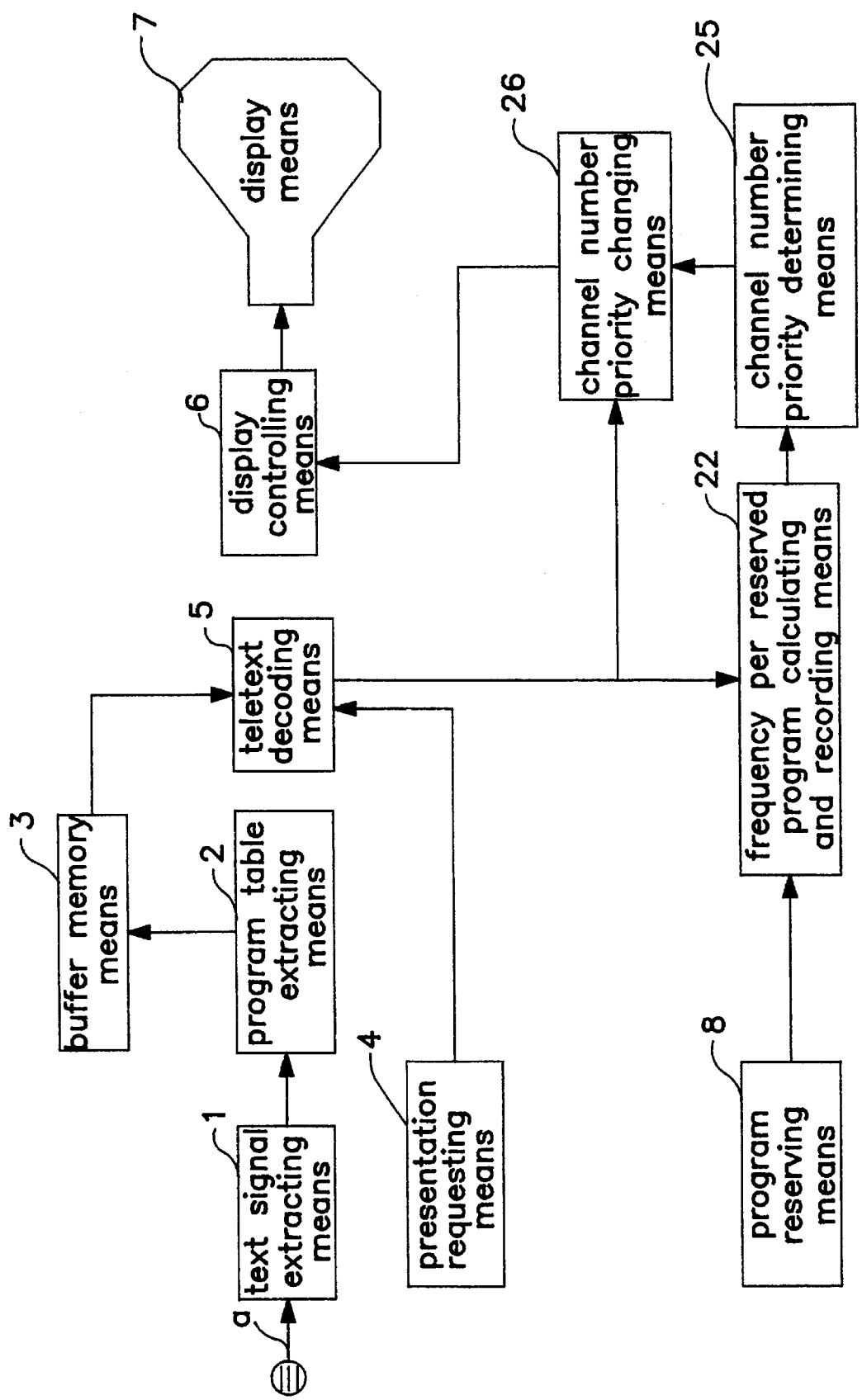
FIG. 8 is a block diagram of a program table displaying apparatus in accordance with a third exemplary embodiment of the present invention.

FIG. 8 is a block diagram of a program table displaying apparatus in accordance with a third exemplary embodiment of the present invention. The blocks having similar functions to those in FIG. 5 are numbered with the same reference numbers.

Channel number priority determining means 25 determines the priority order of the channels by assigning a priority to in the channels having a higher reservation frequency in the program table displayed on the display means 7, based on the frequency calculated at the frequency per reserved program calculating and storing means 22. Channel number priority changing means 26 changes the priority order of the channels according to the priority determined by the channel number priority determining means 25.

FIG. 9 is an example of program table display using a program table displaying apparatus in accordance with the third exemplary embodiment of the present invention.

When the program to be reserved is selected by the program reserving means 8 from the program table displayed on the display means 7, the 4-dimensional arrangement F(day of the week, time to start, time to end, channel number) is determined by the frequency per reserved program calculating and storing means 22 using the same procedure in the second exemplary embodiment. The channels having many high reservation frequency programs are extracted and their priority is determined by the channel number priority determining means 25. Emphasis is placed upon the terms of "day of the week" and "channel number". Then, the priority order of the channels are changed by the channel number priority changing means 26 in the order determined by the channel number priority determining means 25. Finally, the channels are displayed on the display means 7 through the display controlling means 6.

In the program table shown in FIG. 7, for example, assuming that the highlighted, colored, (shaded) programs are the programs having a high reservation frequency and the program "From 30" of Channel #4 has a higher reservation frequency than the program "Wide show" of Channel #3, the priority order of the channels is Channel #2, Channel #4, Channel #3, Channel #1. The rearranged program table is displayed on the display means 7 as shown in FIG. 9.

(Fourth exemplary embodiment)

Figure 10:
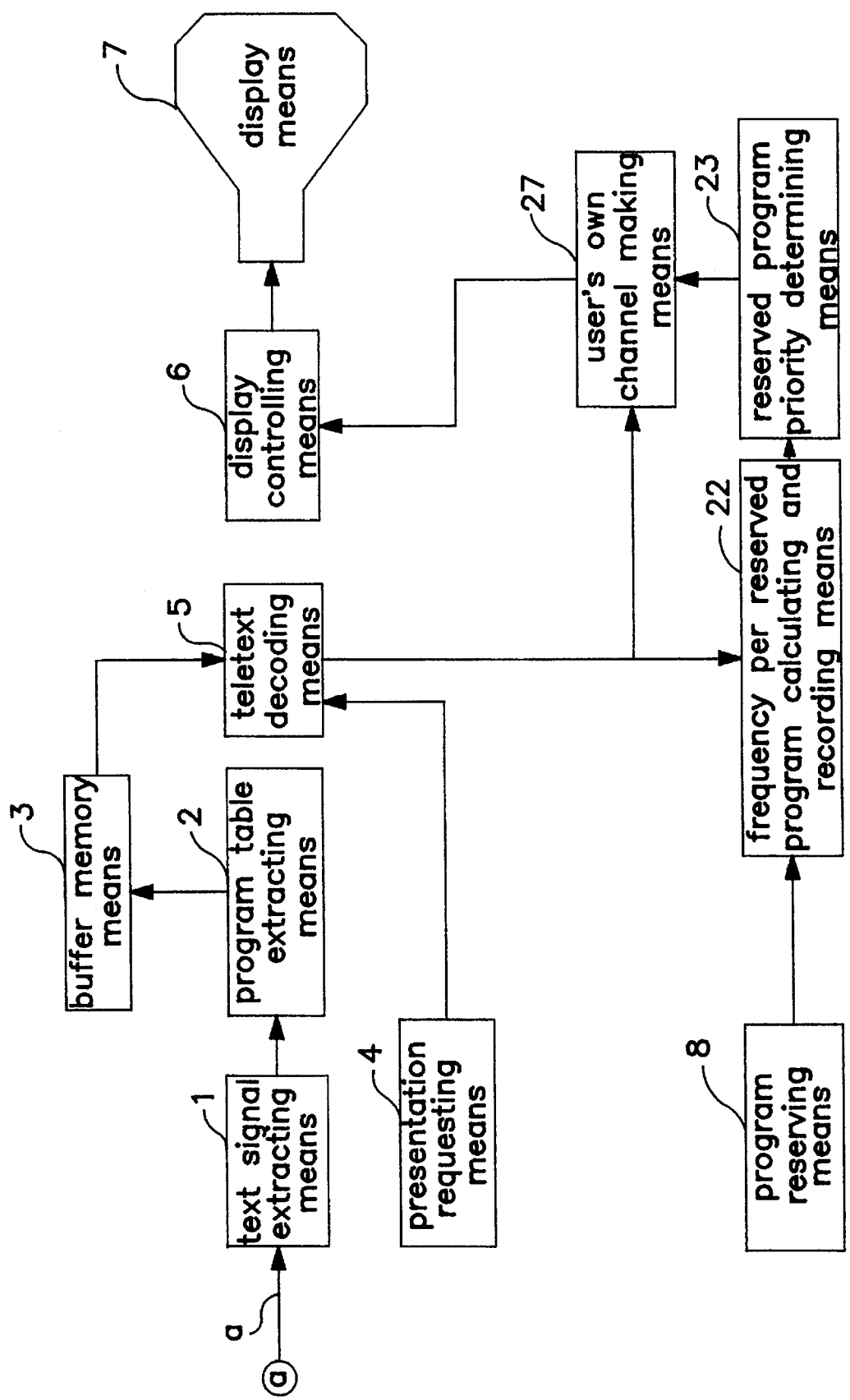
FIG. 10 is a block diagram of a program table displaying apparatus in accordance with a fourth exemplary embodiment of the present invention.

FIG. 10 is a block diagram of a program table displaying apparatus in accordance with a fourth exemplary embodiment of the present invention. The blocks having similar functions to those in FIG. 5 are numbered with the same reference numbers.

User's own channel making means 27 makes a user's exclusive program table, inserting the programs selected at the reserved program priority determining means 23 in the first vertical row of the program table by time.

FIG. 7 is an example of program table display using a program table displaying apparatus in accordance with the second exemplary embodiment of the present invention. FIG. 11 is an example of program table display using a program table displaying apparatus in accordance with the fourth exemplary embodiment of the present invention.

When the program to be reserved is selected at the program reserving means 8 from the program table displayed on the display means 7, the 4-dimensional arrangement F(day of the week, time to start, time to end, channel number) is calculated at the frequency per reserved program calculating and storing means 22 using the same procedure in the second exemplary embodiment. The programs having a high reservation frequency are extracted and their priority is determined at the reserved program priority determining means 23 in the program table decoded at the teletext decoding means 5 using the 4-dimensional arrangement, F(day of the week, time to start, time to end, channel number) calculated at the frequency per reserved program calculating and storing means 22. Then, at the user's own channel making means 27, the programs selected at the reserved program priority determining means 23 are substituted in the corresponding frame in the first vertical row of the program table. Thus, a user's own program table is created and displayed on the display means 7 as shown in FIG. 11.

According to the first exemplary embodiment, a program table for different channels can be displayed on the screen like a program table of a newspaper, using program information from teletext broadcasts. The broadcasting station names are displayed by their names, not by numerals. The simultaneous program display for the different channels similar to a newspaper allows the channels and programs to be easily recognized at a glance.

According to the second exemplary embodiment, by highlighting, coloring, the programs having a high reservation frequency, when the programs are reserved for a number of simultaneously displayed channels, the user's ability to recognize a desired channel is improved, the time required to reserve a program is shortened, and recording of the reservation is made easier.

According to the third exemplary embodiment, by arranging the priority order of the channels according to the reservation frequency, the recognizability of a program is improved, the time required to make a reservation is shortened, and making the reservation is made can easier.

According to the fourth exemplary embodiment, by displaying the user's own program table in which only the programs having a high reservation frequency are gathered in a first vertical row of the table, the recognizability of programs are improved, the time required for making a reservation is shortened, and making a reservation is made easier.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A program table displaying apparatus comprising:

display controlling means for displaying a program table derived from a plurality of teletext broadcasts, said program table including
(a) a plurality of programs,
(b) a plurality of channel numbers corresponding to respective ones of said plurality of programs, and
(c) a plurality of time numbers corresponding to respective ones of said plurality of programs;

program reserving means for reserving a desired program to be recorded by selecting one of said plurality of programs included in said program table;

time comparing means for comparing a selected time frame with a first channel of said plurality of channels to determine if one of said time numbers corresponding to one of said plurality of programs on said first channel corresponds to said selected time frame to ascertain if there is a corresponding program;

minute information extracting means for extracting minute data for said corresponding program;

program title extracting means for extracting a program title corresponding to said corresponding program, said program title having a number of letters;

number of rows calculating means for calculating a calculated area of said program table to include said corresponding program having said program title; and time frame determining means, using said calculated area, for determining an overall size of said program table to include said corresponding program.

2. A program table displaying apparatus comprising:

display controlling means for displaying a program table derived from a plurality of teletext broadcasts, said teletext broadcasts having station name data corresponding to a plurality of programs, said program table including
(a) a plurality of programs;
(b) a plurality of channel numbers corresponding to respective ones of said plurality of programs; and
(c) a plurality of time numbers corresponding to respective ones of said plurality of programs;

program reserving means for reserving a desired program to be recorded by selecting one of said plurality of programs in said program table;

broadcasting station name extracting means for extracting a station name from said station name data and for displaying said station name on said display means in said program table;

number of rows calculating means for calculating a calculated area of said program table to include a program having a program title; and time frame determining means, using said calculated area, for determining an overall size of said program table to include said program having a program title.

3. A program table displaying apparatus as recited in claim 1, wherein said display controlling means comprises:

number of horizontal picture elements doubling means for doubling a dot frequency and for doubling a number of horizontal picture elements of the program table;

number of scanning lines doubling means for doubling a number of scanning lines of the program table by interlacing; and fount compressing means for reducing the size of teletext broadcast letters received from said plurality of teletext broadcast to be included in said program table.

4. A program table displaying apparatus as recited in claim 2, wherein said display controlling means comprises:

number of horizontal picture elements doubling means for doubling a dot frequency and for doubling a number of horizontal picture elements of the program table;

number of scanning lines doubling means for doubling a number of scanning lines of the program table by interlacing; and fount compressing means for reducing the size of teletext broadcast letters received from said plurality of teletext broadcast to be included in said program table.

5. A program table displaying apparatus comprising:

display controlling means for displaying a program table derived from a plurality of teletext broadcasts, said program table including
(a) a plurality of programs;
(b) a plurality of channel numbers corresponding to respective ones of said plurality of programs; and
(c) a plurality of time numbers corresponding to respective ones of said plurality of programs;

program reserving means for reserving a desired program to be recorded by selecting one of said plurality of programs;

frequency per reserved program calculating and storing means for calculating the frequency one of said plurality of programs is reserved;

reserved program priority determining means for determining a priority of reserved programs based on the frequency calculated by said frequency per reserved program calculating and storing means; and color processing means for highlighting said one of said plurality of programs in said program table if the priority of said one of said plurality of programs is a high priority.

6. A program table displaying apparatus comprising:

display controlling means for displaying a program table derived from a plurality of teletext broadcasts which have been one of (1) previously received and stored and (2) currently being received, said program table including
(a) a plurality of programs;
(b) a plurality of channel numbers corresponding to respective ones of said plurality of programs, said plurality of channel numbers arranged in said program table according to a priority order; and
(c) a plurality of time numbers corresponding to respective ones of said plurality of programs;

program reserving means for reserving a desired program to be recorded by selecting one of said plurality of programs;

frequency per reserved program calculating and recording means for calculating a frequency that one of said plurality of programs is reserved;

channel number priority determining means, using the calculated frequency, for determining a channel priority of said plurality of channels; and channel number priority changing means, in response to said channel priority, for changing the priority order of said plurality of channels in said program table.

7. A program table displaying apparatus comprising:

display controlling means for displaying a program table derived from a plurality of teletext broadcasts, said program table including (a) a plurality of programs;
(b) a plurality of channel numbers corresponding to respective ones of said plurality of programs; and
(c) a plurality of time numbers corresponding to respective ones of said plurality of programs;
program reserving means for reserving a desired program to be recorded by selecting one of said plurality of programs;
frequency per reserved program calculating and recording means for calculating a frequency that one of said plurality of programs is reserved;
reserved program priority determining means for determining if one of said plurality of programs has a high priority based on the calculated frequency; and
user's own channel making means for creating a user's exclusive program table by grouping the programs with a high priority in a specified area of said program table.

* * * * *